(12) United States Patent
Lao

(10) Patent No.: US 8,334,065 B2
(45) Date of Patent: Dec. 18, 2012

(54) BATTERY COVER LATCH ASSEMBLY

(75) Inventor: Po-Chao Lao, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 572 days.

(21) Appl. No.: 12/603,168

(22) Filed: Oct. 21, 2009

(65) Prior Publication Data

US 2010/0279163 A1  Nov. 4, 2010

(30) Foreign Application Priority Data

Apr. 30, 2009  (CN) .......................... 2009 1 0302064

(51) Int. Cl.
*H01M 2/10* (2006.01)
*H04B 1/38* (2006.01)
*H05K 5/00* (2006.01)

(52) U.S. Cl. ............ 429/100; 429/96; 429/97; 429/163; 429/176; 455/90.3; 455/347; 455/575.1; 361/679.01

(58) Field of Classification Search .................. None
See application file for complete search history.

(56) References Cited

U.S. PATENT DOCUMENTS

| 6,060,193 | A  | * | 5/2000 | Remes et al. | ............. | 429/96 |
| 2006/0115715 | A1 | * | 6/2006 | Ge et al. | ................... | 429/97 |
| 2007/0111086 | A1 | * | 5/2007 | Li et al. | ........................ | 429/97 |

* cited by examiner

*Primary Examiner* — Cynthia Lee
(74) *Attorney, Agent, or Firm* — Altis Law Group, Inc.

(57) ABSTRACT

A battery cover latch assembly comprises a battery housing member, a battery cover releasably secured to the battery housing member, a latch system and an adjustment system. The latch system is formed between the battery cover and the battery housing member, to secure the battery cover to the battery housing member. The adjustment system is formed between the battery cover and the battery housing member, to adjust the securing engagement between the battery cover and the battery housing member.

19 Claims, 5 Drawing Sheets

US 8,334,065 B2

BATTERY COVER LATCH ASSEMBLY

BACKGROUND

1. Technical Field

The exemplary disclosure generally relates to battery storage, and particularly to a battery cover latch assembly used in portable electronic devices.

2. Description of Related Art

Portable electronic devices, such as two-way radios, telephones, electronic games and personal data assistants for example, often receive operating power from a removable battery. In many such configurations, a removable battery is secured to a housing of the portable electronic device by a latch system. The latch system ordinarily includes a portion situated on a battery cover, and a portion situated on the housing. These portions engage with each other to secure the battery in the portable electronic device.

In one commonly used structure, the latch system includes a catch on the battery cover that engages with a latch member on the housing. Removal of the battery from the housing is normally accomplished by sliding the battery cover relative to the housing, disengaging the latch member. One problem with this method is that abrasion is inflicted between the catch and the latching member during the sliding operation. Thereby, the battery cover may have to be replaced after time, which can result in substantial expense.

Therefore, there is room for improvement in the arts.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary battery cover latch assembly. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
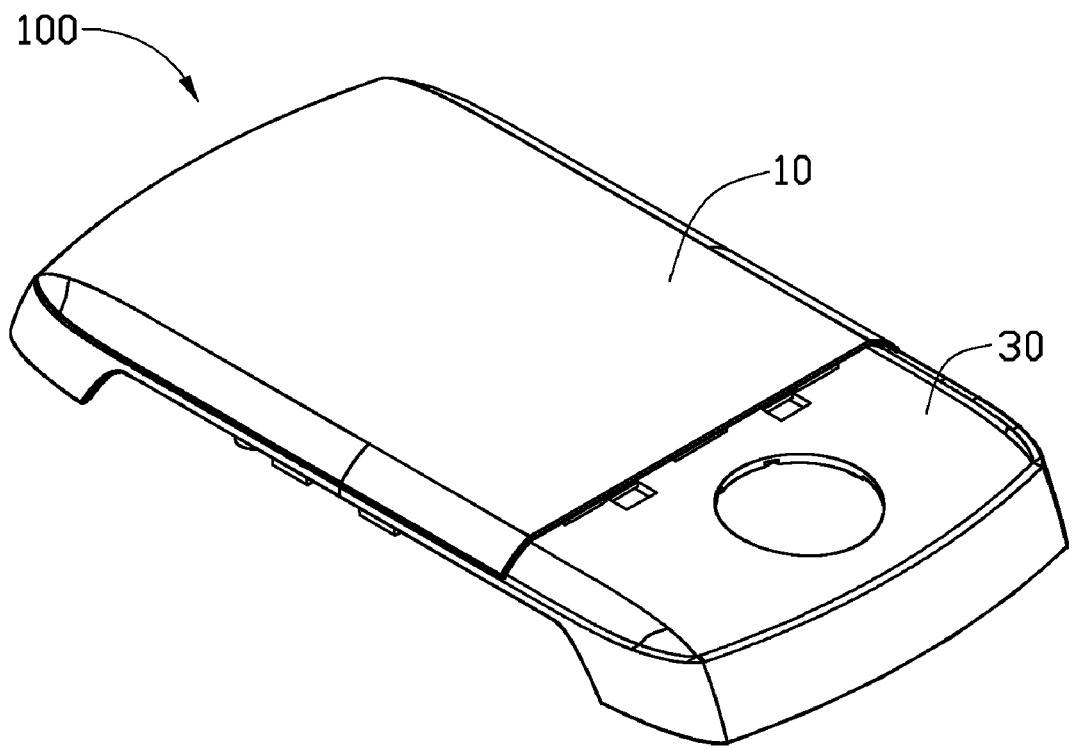
FIG. 1 is an assembled view of an exemplary embodiment of a battery cover latch assembly including a battery housing member, a battery cover, a latch system, and an adjustment system.
Figure 2:
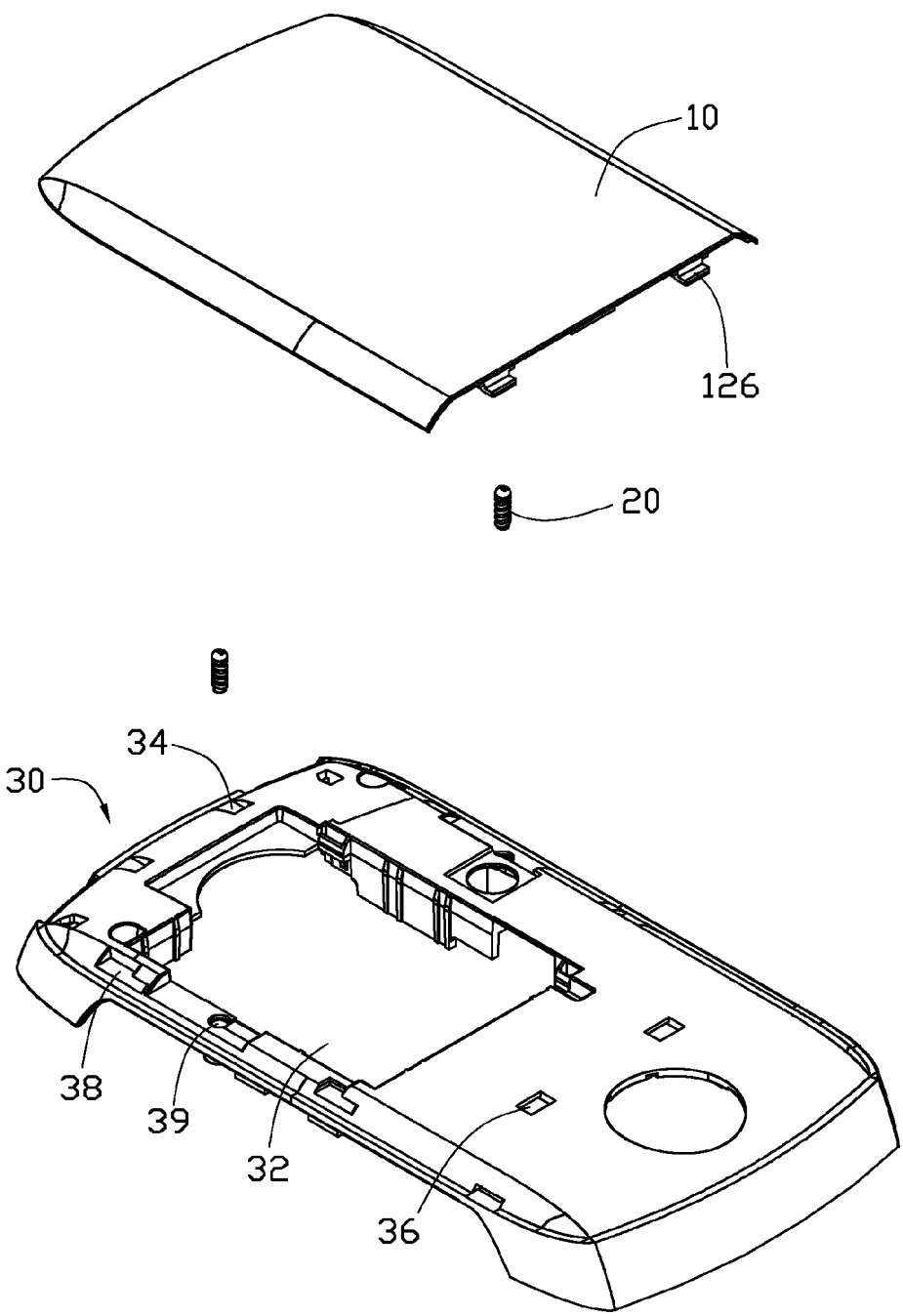
FIG. 2 is an exploded view of the battery latch assembly shown in FIG. 1.

Referring to FIGS. 1 and 2, an exemplary battery cover latch assembly 100 used in a portable electronic device for accommodating a battery is shown. The battery cover latch assembly 100 includes a battery cover 10, one or more fasteners 20, such as bolts, and a battery housing member 30. The battery cover 10 is releasably mounted to the battery housing member 30. The fasteners 20 are located between the battery cover 10 and the battery housing member 30, to firmly secure the battery cover 10 the battery housing member 30.

Figure 4:
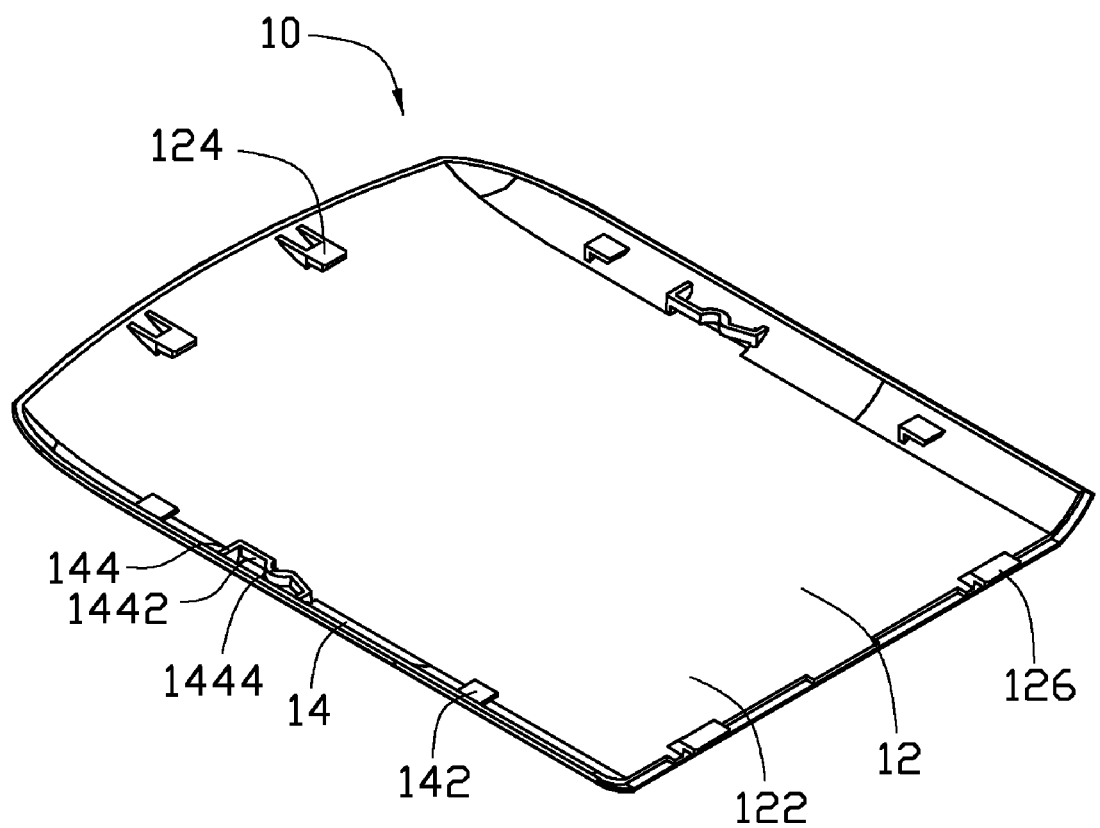
FIG. 4 is a partially enlarged view of the battery cover shown in FIG. 2, but showing the battery cover in another aspect.

Referring to FIGS. 2 and 4, the battery cover 10 includes a bottom wall 12 and two opposite sidewalls 14 extending from two opposite peripheral edges of the bottom wall 12. The bottom wall 12 includes a first surface 122 facing the battery housing member 30. The battery cover 10 has one or more catches 124 protruding from the first surface 122 adjacent to one end thereof. The battery cover 10 further has one or more latches 126 protruding from the first surface 122 adjacent to another end thereof, opposite to the catches 124. The catches 124 and the latches 126 are both configured to latch the battery cover 10 to the battery housing member 30. Moreover, the battery cover 10 has one or more hooks 142 and one or more resilient arms 144 respectively protruding from an inner surface of each sidewall 14. The hooks 142 are substantially L-shaped and configured for latching the battery cover 10 to the battery housing member 30. Each resilient arm 144 is substantially U-shaped and includes a resisting portion 1442 parallel to a corresponding sidewall 14. Each resilient arm 144 further has a semi-circular slot 1444 defined in the resisting portion 1442 facing the sidewalls 14. The arms 144 are configured to adjust the securing engagement between the battery cover 10 and the battery housing member 30, and will be described hereafter.

Figure 3:
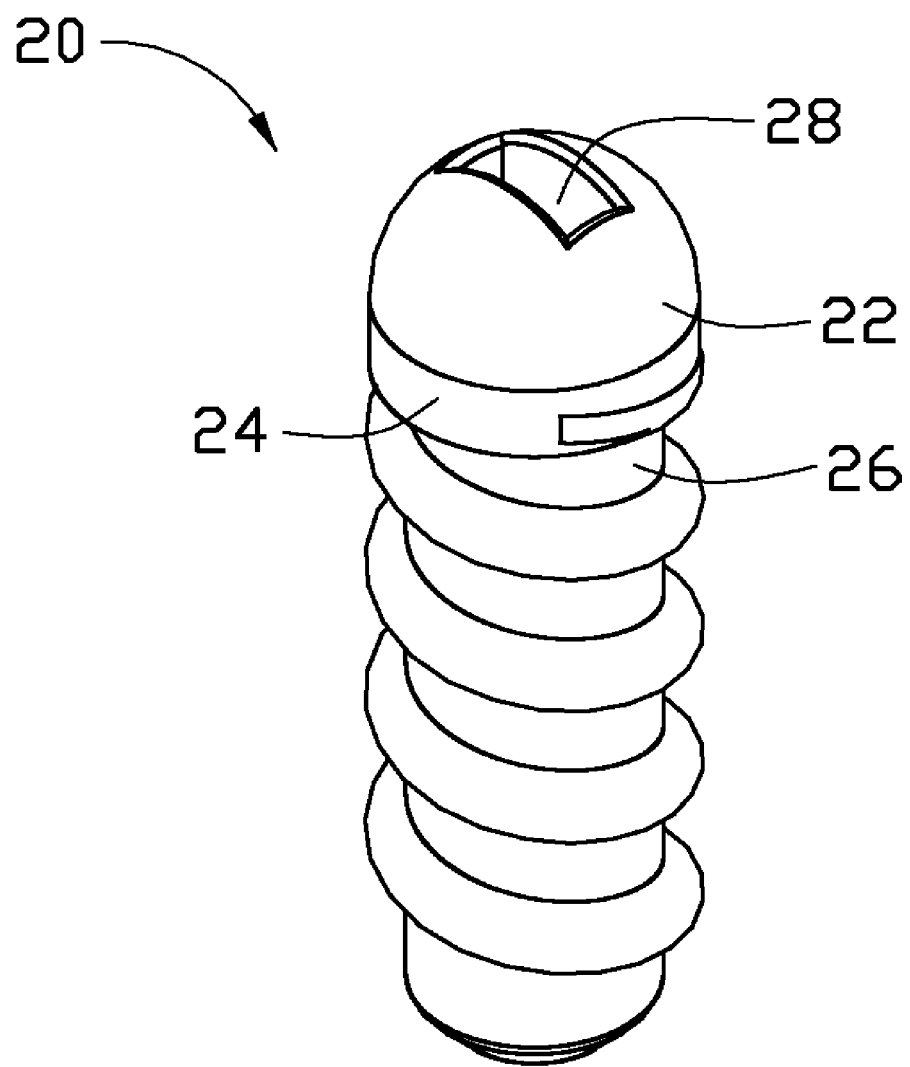
FIG. 3 is a partially enlarged view of the adjustment system shown in FIG. 2, but showing the adjustment system in another aspect.

Referring to FIG. 3, each fastener 20 includes a head portion 22, a washer portion 24 protruding from an end of the head portion 22 and a threaded portion 26 protruding from a distal end of the washer portion 24. Another end of the head portion 22 has a recess 28 defined therein, for using a tool to rotate the fasteners 20. The head portion 22 is substantially a hemisphere with a diameter exceeding that of the slot 1444. The threaded portions 26 are configured to fix the fasteners 20 to the battery housing member 30.

Referring back to the FIG. 2, the battery housing member 30 has a compartment 32 defined therein for receiving a battery (not shown). The battery housing member 30 further has one or more catch holes 34 and latch holes 36 respectively. The catch holes 34 correspond in size to, and are configured to receive, the catches 124, respectively. The latches holes 36 correspond in size to, and are configured to receive, the latches 126, respectively. Moreover, the battery housing member 30 has one or more hook holes 38 and fastener holes 39 respectively defined in two other opposite sides of the compartment 32. The hook holes 38 correspond in size to, and are configured to receive, the hooks 142, respectively. The fastener holes 39 correspond in size to, and are configured to receive, the fasteners 20, respectively.

In operation, the catches 124 latch the catch holes 34, the latches 126 latch the latch holes 36 and the hooks 142 latch the hook holes 38, together making up a latch system releasably securing the battery cover 10 to the battery housing member 30.

Figure 5:
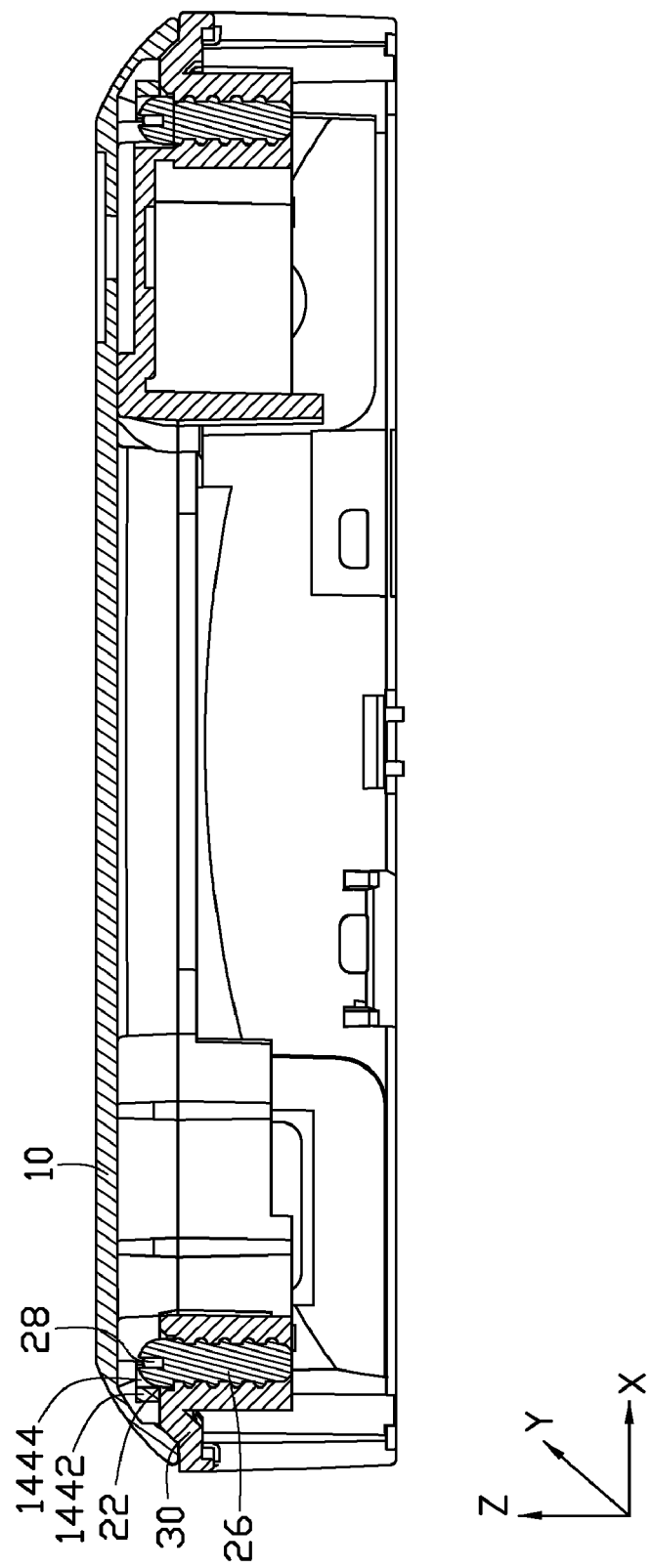
FIG. 5 is an enlarged cross-section of the battery cover latch assembly shown in FIG. 1.

Referring to FIG. 5, in use, the fasteners 20 can be rotated clockwise or counter-clockwise by an appropriate tool, such as a screwdriver received in the recess 28 in the fastener holes 39, such that the fasteners 20 can be upwardly and downwardly moved in the slot 1444 along a Z axis; and the head portions 22 will move toward or away from the resilient resisting portions 1442 of the resilient arms 144 along the X and Y axes. In other words, the securing engagement of the head portions 22 and the resilient resisting portions 1442 can be adjusted by rotating the fasteners 20. Thereby, the fasteners 20 and the resilient arms 144 act as an adjustment system, to adjust the securing engagement between the battery cover 10 and the battery housing member 30. For instance, when the fasteners 20 become loosely secured with the arms 144, the fasteners 20 can be rotated in a direction causing them to rise along the axis Z, such that the head portions 22 of the fasteners 20 move toward and bias the resilient resisting portions 1442 of the resilient arms 144, in a plane limited by axes X and Y. Thereby, the head portions 22 of the fasteners 20 again become firmly secured with the resisting portion 1442 of the resilient arms 144. Therefore, the battery cover 10 remains firmly secured to the battery housing member 30.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch assembly, comprising:
   a battery housing member;
   a battery cover releasably secured to the battery housing member;
   a latch system formed between the battery cover and the battery housing member to secure the battery cover to the battery housing member; and
   an adjustment system comprising a plurality of fasteners rotatably mounted to the battery housing member and a plurality of resilient arms protruding from the battery cover corresponding to the fasteners, each fastener comprising a head portion, each resilient arm comprising a resilient resisting portion resisting a corresponding head portion;
   wherein each resilient resisting portion comprises a semi-circular slot defined therein; each head portion is substantially hemispherical with a diameter exceeding the diameter of the slot; and the head portions are partially accommodated in the slots, respectively.

2. The battery cover latch assembly as claimed in claim 1, wherein the latch system comprises a plurality of catch holes and a plurality of latch holes defined in the battery housing member and a plurality of catches and a plurality of latches formed on the battery cover; the catches releasably latching the catch holes and the latches releasably latching the latch holes.

3. The battery cover latch assembly as claimed in claim 2, wherein the latch system further comprises a plurality of hook holes defined in the battery housing member and a plurality of hooks formed on the battery cover; the hooks releasably latching the hook holes.

4. The battery cover latch assembly as claimed in claim 1, wherein the battery housing member comprises a plurality of fastener holes defined therein; each fastener further comprises a thread portion rotatably accommodated in a corresponding fastener hole.

5. The battery cover latch assembly as claimed in claim 4, wherein each fastener has a washer portion formed between the head portions and the threaded portions.

6. The battery cover latch assembly as claimed in claim 1, wherein each head portion has a recess defined therein, for use with a tool to rotate the fasteners.

7. The battery cover latch assembly as claimed in claim 1, wherein the battery cover comprises a bottom wall and two opposite sidewalls extending from two opposite peripheral edges of the bottom wall; and the resilient arms respectively protrude from an inner surface of each sidewall.

8. The battery cover latch assembly as claimed in claim 7, wherein the resilient resisting portions are parallel to corresponding sidewalls.

9. The battery cover latch assembly as claimed in claim 7, wherein the bottom wall comprises a first surface facing the battery housing member; the catches protrude from the first surface adjacent to one end of the bottom wall, the latches protrude from the first surface adjacent to another end of the bottom wall, opposite to the catches.

10. A battery cover latch assembly, comprising:
    a battery housing member comprising a plurality of catches protruding therefrom and a plurality of latches protruding therefrom;
    a battery cover comprising a plurality of catch holes releasably latching the catches, a plurality of latch holes releasably latching the latch holes and a plurality of resilient arms protruding therefrom, each resilient arm comprising a resilient resisting portion; and
    a plurality of fasteners rotatably mounted to the battery housing member, each fasteners comprising a head portion resisting a corresponding resisting portion;
    wherein each resilient resisting portion comprises a semi-circular slot defined therein; each head portion is substantially hemispherical with a diameter exceeding the diameter of the slot; and the head portions are partially accommodated in the slots, respectively.

11. The battery cover latch assembly as claimed in claim 10, wherein the battery housing member further comprises a plurality of hooks protruding therefrom; the battery cover further comprises a plurality of hook holes; the hooks are releasably latching the hook holes.

12. The battery cover latch assembly as claimed in claim 10, wherein the battery housing member comprises a plurality of fastener holes defined therein; each fastener further comprises a thread portion rotatably accommodated in a corresponding fastener hole.

13. The battery cover latch assembly as claimed in claim 12, wherein each fastener comprises a washer portion formed between the head portions and the threaded portions.

14. A battery cover latch assembly, comprising:
    a battery housing member;
    a battery cover releasably secured to the battery housing member, the battery cover comprising a bottom wall and two opposite sidewalls extending from two opposite peripheral edges of the bottom wall;
    a latch system formed between the battery cover and the battery housing member to secure the battery cover to the battery housing member; and
    an adjustment system comprising a plurality of fasteners rotatably mounted to the battery housing member and a plurality of resilient arms protruding from the battery cover corresponding to the fasteners, the resilient arms respectively protruding from an inner surface of each sidewall; each resilient arm comprising a resilient resisting portion, the resilient resisting portions being parallel to corresponding sidewalls;
    wherein after the fasteners are rotated in the battery housing member along an axis at a first direction, the fasteners resist the resilient arms and adjust the resilient arms along a second direction and a third direction perpendicular to the first direction, to adjust a resisting degree between the fastener and the resilient arm, thereby adjusting the securing engagement between the battery housing member and the battery cover correspondingly.

15. The battery cover latch assembly as claimed in claim 14, wherein each fastener comprises a head portion, each resilient arm comprises a resilient resisting portion, and the resilient resisting portions resist the head portions, respectively.

16. The battery cover latch assembly as claimed in claim 15, wherein each resilient resisting portion comprises a semi-circular slot defined therein; each head portion is substantially hemispherical with a diameter exceeding the diameter of the slot; and the head portions are partially accommodated in the slots, respectively.

17. The battery cover latch assembly as claimed in claim 16, wherein the battery housing member comprises a plurality of fastener holes defined therein; each fastener further comprises a thread portion rotatably accommodated in a corresponding fastener hole.

18. The battery cover latch assembly as claimed in claim 17, wherein each fastener has a washer portion formed between the head portions and the threaded portions.

19. The battery cover latch assembly as claimed in claim 14, wherein the battery housing member further comprises a plurality of hooks protruding therefrom; the battery cover further comprises a plurality of hook holes; the hooks are releasably latching the hook holes.

* * * * *